US010413958B2

(12) United States Patent
Horii et al.

(10) Patent No.: US 10,413,958 B2
(45) Date of Patent: Sep. 17, 2019

(54) BACK PRESSURE DEVICE FOR PROGRESSIVE DIE APPARATUS AND PROGRESSIVE DIE APPARATUS PROVIDED THEREWITH (71) Applicant: KURODA PRECISION INDUSTRIES LTD., Kanagawa (JP)

(72) Inventors: Hideo Horii, Kanagawa (JP); Kenichi Shindo, Kanagawa (JP)

(73) Assignee: KURODA PRECISION INDUSTRIES LTD., Kanagawa (JP)

(*) Notice: Subject to any disclaimer, the term of this patent is extended or adjusted under 35 U.S.C. 154(b) by 467 days.

(21) Appl. No.: 15/123,306

(22) PCT Filed: Mar. 4, 2014

(86) PCT No.: PCT/JP2014/001175
§ 371 (c)(1),
(2) Date: Sep. 2, 2016

(87) PCT Pub. No.: WO2015/132814
PCT Pub. Date: Sep. 11, 2015

(65) Prior Publication Data
US 2017/0072448 A1 Mar. 16, 2017

(51) Int. Cl.
*B21D 28/14* (2006.01)
*H02K 7/06* (2006.01)
(Continued)

(52) U.S. Cl.
CPC .............. *B21D 28/14* (2013.01); *B21C 51/00* (2013.01); *B21D 22/20* (2013.01); *B21D 28/145* (2013.01); *H02K 7/06* (2013.01)

(58) Field of Classification Search
CPC ...... B21D 45/003; B21D 45/02; B21D 45/04; B21D 45/006; B21D 43/22; B21D 28/02; B21D 28/14; B21D 28/145
See application file for complete search history.

(56) References Cited

U.S. PATENT DOCUMENTS

2012/0266456 A1* 10/2012 Hladnik ................ B21D 28/22
29/732
2015/0007627 A1* 1/2015 Yamanouchi ....... B30B 15/0041
72/20.2

FOREIGN PATENT DOCUMENTS

EP 0042046 12/1981
JP 2002297284 10/2002
(Continued)

OTHER PUBLICATIONS

Japanese International Search Report and English Translation PCT/JP2014/001175, dated Jun. 3, 2014 (6 pages).

*Primary Examiner* — Debra M Sullivan
(74) *Attorney, Agent, or Firm* — Dority & Manning, P.A.

(57) ABSTRACT

In a back pressure device for progressive die apparatus, a suitable back pressure can be produced during the blanking interval preventing the iron core laminates from being pushed upward by using a simple structure. The back pressure device for progressive die apparatus comprises a support table (31) disposed in a vertically moveable manner in an iron core retaining member (22) for retaining iron core laminates blanked from the sheet steel strip in the progressive die apparatus (1) and for stacking the iron core laminates thereon one after another, a support unit (32) for supporting the support table, a lifting motor (33) for causing a vertical movement of the support table via the support unit and a control unit (34) for controlling a rotational motion of the lifting motor, wherein the control unit is configured to set a plurality of torque limit values for limiting an output torque of the lifting motor depending on an action of the progressive die apparatus so that the output torque is limited by a largest of the torque limit values during a blanking interval for the iron core laminates.

8 Claims, 8 Drawing Sheets (51) Int. Cl.
  *B21C 51/00*   (2006.01)
  *B21D 22/20*   (2006.01)

(56) References Cited

FOREIGN PATENT DOCUMENTS

| | | |
|---|---|---|
| JP | 2005334893 | 12/2005 |
| JP | 2007215376 | 8/2007 |
| JP | 4578272 | 11/2010 |
| JP | 2012208673 | 10/2012 |
| WO | WO 2011053258 | 5/2011 |

\* cited by examiner

BACK PRESSURE DEVICE FOR PROGRESSIVE DIE APPARATUS AND PROGRESSIVE DIE APPARATUS PROVIDED THEREWITH

CROSS-REFERENCE TO RELATED APPLICATIONS

This application is the U.S. National Stage entry of International Application Number PCT/JP2014/001175 filed under the Patent Cooperation Treaty having a filing date of Mar. 4, 2014, the disclosure of which is hereby incorporated by reference herein in its entirety for all purposes.

TECHNICAL FIELD

The present invention relates to a back pressure device for progressive die apparatus for manufacturing laminated cores formed by laminating a plurality of iron core laminates, and progressive die apparatus provided with such a back pressure device.

BACKGROUND ART

Progressive die apparatus is typically employed for manufacturing laminated iron cores for rotating electric machines from a strip of electromagnetic steel sheet in coil form (sheet steel strip). In the progressive die apparatus, iron core laminates are produced from the sheet steel strip by sequentially punching out pilot holes, slots and inner teeth and blanking the individual iron core laminates. A prescribed number of iron core laminates are stacked and fixedly attached to one another to finally produce the iron cores.

The iron core laminates that are blanked by the blanking punch are pushed into a squeeze ring placed under the die one by one, and are laminated and stacked together while receiving a side pressure from the squeeze ring which has an inner diameter substantially equal to or slightly smaller than the outer diameter of the iron core laminates. The methods for fixedly attaching the iron core laminates with one another include the lamination crimping method where each individual iron core laminate is formed with a crimping feature so that the adjoining iron core laminates are crimped to one another as the iron core laminates are laminated and stacked, the laminating bonding method where a bonding agent is applied to a surface of the sheet steel strip in the progressive die apparatus, and the iron core laminates are bonded to one another simultaneously as the iron core laminates are laminated and the laser welding method where the blanked iron core laminates are laser welded to one another.

To more effectively stack the iron core laminates in the squeeze ring, various back pressure devices have been produced. A support table is placed under the squeeze ring (ejecting end of the laminated iron core) to apply an upward pressure (back pressure) on the lower surface of the lowermost iron core laminate. For instance, in the lamination crimping method, the back pressure on the iron core laminates may be increased for increasing the crimping mechanical strength. However, if the increased back pressure exceeds the retaining force for the iron core laminates created by the side pressure, the iron core laminates in the squeeze ring (or in the die) may be pushed upward by the support table.

To overcome such a problem, it was proposed to provide a vertically moveable base table, an elastic member (such as a gas spring) placed on the base table and a support plate attached to the upper end of the elastic member to stack iron core laminates thereon such that the vertical position of the base table may be fixed during the downward stroke of the punch. The elastic member is compressed by the support plate which is pushed downward by the downward stroke of the punch, and applies a force that counteracts the pressure from the punch to the support plate so that the back pressure may be more effectively applied to the iron core laminates. See Patent Document 1.

PRIOR ART DOCUMENT(S)

Patent Document(s)

Patent Document 1: JP4578272B

SUMMARY OF THE INVENTION

Task to be Accomplished by the Invention

However, according to the prior art disclosed in Patent Document 1, because of the need to provide a mechanism for supporting the support plate via the gas spring fitted to the base table, the structure of the back pressure device becomes undesirably complex and costly. Furthermore, according to this prior art, a guide member (or an assist mechanism) for guiding the vertical movement of the support plate positioned on top of the elastic member is required in order to maintain the upper surface of the support plate in a horizontal attitude.

The present invention was made in view such problems of the prior art, and has a primary object to provide a back pressure device for progressive die apparatus that can produce a suitable back pressure during the downward stroke of the punch while preventing the iron core laminates from being pushed upward by using a simple structure, and progressive die apparatus equipped with such a back pressure device.

Means for Accomplishing the Task

To achieve such an object, a first aspect of the present invention provides a back pressure device (6) for progressive die apparatus for blanking iron core laminates (2) from intermittently transported sheet steel strip (W) and stacking a plurality of iron core laminates into individual iron cores (3), comprising: a support table (31) disposed in a vertically moveable manner in an iron core retaining member (22) for retaining iron core laminates blanked from the sheet steel strip in the progressive die apparatus (1) and for stacking the iron core laminates thereon one after another; a support unit (32) for supporting the support table; a lifting motor (33) for causing a vertical movement of the support table via the support unit; and a control unit (34) for controlling a rotational motion of the lifting motor; wherein the control unit is configured to set a plurality of torque limit values for limiting an output torque of the lifting motor depending on an action of the progressive die apparatus so that the output torque is limited by a largest of the torque limit values during a blanking interval for the iron core laminates.

According to the back pressure device for progressive die apparatus based on the first aspect of the present invention, it is possible, with a highly simple structure, to produce a suitable back pressure during a blanking interval for the iron core laminates while preventing the iron core laminates from being pushed upward by an excessive back pressure applied from the support table. More specifically, the pushing up of the iron core laminates is prevented by selecting a relatively low torque limit value during a non-blanking interval for the iron core laminates, and the torque limit value during the blanking interval for the iron core laminates is increased so that the contact between the iron core laminates may be enhanced, and the volume ratio of the iron core laminates may be increased.

According to a second aspect of the present invention, in combination with the first aspect of the present invention, the control unit is configured to limit the output torque of the lifting motor at all times, and the torque limit values consist of a high torque limit value for a blanking inter al for the iron core laminates and a low torque limit value for a non-blanking interval for the iron core laminates.

The back pressure device for progressive die apparatus based on the second aspect of the present invention is able to apply a suitable back pressure both during the blanking period and the non-blanking period by using a simple control process for the lifting motor that uses two torque limit values including the high torque limit value and the low torque limit value, According to a third aspect of the present invention, in combination with the first or second aspect of the present invention, the control unit is configured to perform a position control of the lifting motor at least during a blanking interval for the iron core laminates.

In the back pressure device for progressive die apparatus based on the third aspect of the present invention, an appropriate back pressure can be applied during the blanking interval for the iron core laminates at a high precision, and the pushing up of the iron core laminates can be prevented without regard to the magnitude of the torque limit value by performing a position control while limiting the output torque of the lifting motor according to the given torque limit values during the blanking interval for the iron core laminates.

According to a fourth aspect of the present invention, in combination with any one of the first to third aspects of the present invention, the support unit comprises a ball screw (42) for causing the vertical movement of the support table with a rotative actuation by the lifting motor, and the ball screw is configured to undergo a reverse movement by a downward pressure applied to the support table during a blanking interval for the iron core laminates, In the back pressure device for progressive die apparatus based on the fourth aspect of the present invention, by using a ball screw configured to undergo a reverse movement (or to convert the linear (axial) movement into the rotational movement) in the support unit for supporting the support table, an appropriate back pressure may be applied during the blanking interval, and the load on the support unit and associated parts can be reduced (the blanking load is buffered) owing to the reverse movement of the ball screw caused by the downward movement of the support table during the blanking interval.

According to a fifth aspect of the present invention, in combination with any one of the first to fourth aspects of the present invention, the control unit is configured to control the lifting motor such that the support table is raised or lowered during a blanking interval for the iron core laminates.

In the back pressure device for progressive die apparatus based on the fifth aspect of the present invention, by raising or lowering the support table depending on the blanking condition for the iron core laminates (such as the magnitude of the side pressure of the iron core retaining member), a suitable back pressure may be produced during the blanking period for the iron core laminates.

According to a sixth aspect of the present invention, in combination with the fifth aspect of the present invention, the control unit is configured to perform a position control of the lifting motor such that the support table is moved to a target position during the blanking period for the iron core laminates.

In the back pressure device for progressive die apparatus based on the sixth aspect of the present invention, by raising or lowering the support table within an appropriate range depending on the blanking condition for the iron core laminates, a suitable back pressure may be produced during the blanking period for the iron core laminates.

A seventh aspect of the present invention provides an iron core manufacturing device provided with the back pressure device for progressive die apparatus according to any one of the first to the sixth aspect of the present invention.

Thus, according to the present invention, a suitable back pressure can be produced during the blanking interval while preventing the iron core laminates from being pushed upward by using a simple structure.

DESCRIPTION OF THE PREFERRED EMBODIMENT(S)

Preferred embodiments of the present invention are described in the following with reference to the appended drawings.

Figure 1:
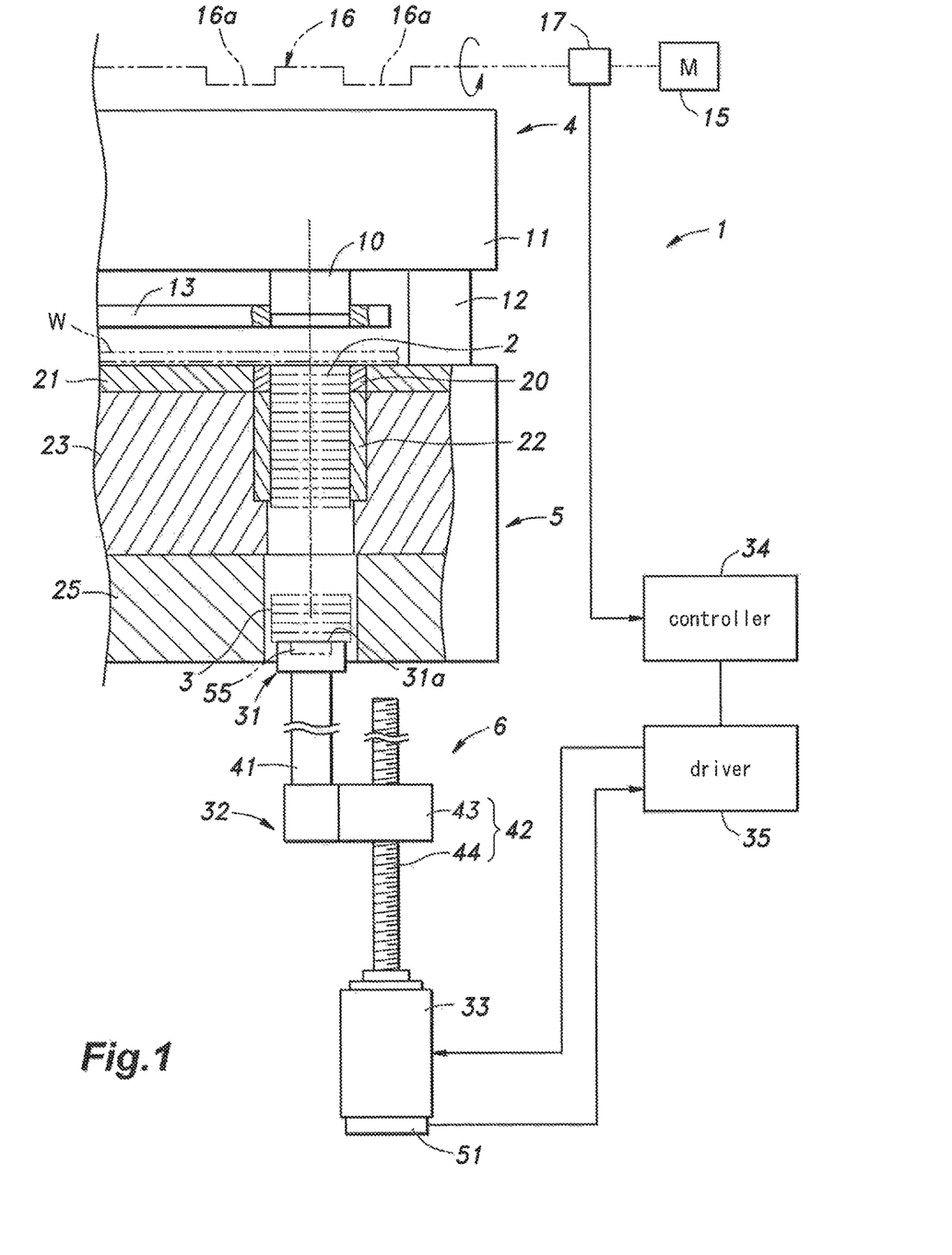
FIG. 1 is a diagram illustrating an essential part of the progressive die apparatus equipped with the back pressure device according to the present invention.

FIG. 1 is a diagram illustrating an essential part of the progressive die apparatus equipped with the back pressure device according to the present invention. The progressive die apparatus I is configured to produce laminated iron cores 3 by performing a punching process on sheet metal strip W (sheet steel strip) consisting of electromagnetic steel sheet and stacking a plurality of iron core laminates 2. The progressive die apparatus 1 essentially consists of an upper die assembly 4 provided in a vertically moveable manner, a lower die assembly 5 fixedly secured to a holder not shown in the drawings and a back pressure device 6 for applying an upward pressure (back pressure) onto the lower surface of the iron core laminates 2 stacked in the lower die assembly 5.

The upper die assembly 4 is provided with a plurality of punches for punching the sheet metal strip W (FIG. 1 showing only a blanking punch 10), a punch retainer 11 for retaining the punches, guide posts 12 extending vertically for guiding the vertical movement of the punch retainer 11 (only the single guide post 12 being shown) and a stripper plate 13 slidably guided by a stripper guide (not shown in the drawings) to separate the sheet metal strip W from the punch following the punching stroke.

The upper part of the upper die assembly 4 is fixedly secured to a slide unit (not shown in the drawings) which moves vertically (by a stroke of 25 mm to 35 mm, for instance). The slide unit converts a rotational motion of a crankshaft 16 driven by an upper drive motor 15 into the vertical movement of the upper die assembly 4 via connecting rods (not shown in the drawings). The slide unit is further provided with an encoder 17 for detecting the angular position of the crankshaft 16 (angular position with respect to a reference angular position of the crankshaft 16) and producing an encoder signal (synchronization signal) corresponding to the detected angular position.

The lower die assembly 5 includes a die 20 having a circular blanking hole formed therein for receiving the punch 10 having a corresponding cylindrical configuration, a die plate 21 supporting the peripheral part of the die 20, a squeeze ring (iron core retaining member) 22 located on the lower end of the die 20 for applying a side pressure (retaining force) onto the iron core laminates 2 stacked in the squeeze ring 22, a die holder 23 fixedly retaining the squeeze ring 22 and supporting the lower surface of the die plate 21 and a sub plate 25 for supporting the lower surface of the die holder 23.

The squeeze ring 22 is used for retaining the blanked iron core laminates 2 in the illustrated embodiment, but other arrangements may also be used instead of the squeeze ring 22 to receive a plurality of iron core laminates 2 for stacking one over another. The iron core retaining member may not only be required to apply amide force to the stacked iron core laminates 2 but may also be required to align the iron core laminates in a tubular hole (guide hole). However, the guide hole may be not only circular but may also be in other configurations such as rectangular, fan-shaped, trapezoidal and T-shaped configurations depending on the shape of the iron core laminates 2.

The inner diameter of the squeeze ring 22 is substantially equal to the inner diameter of the die 20 (or equal to, slightly greater than or slightly smaller than the inner diameter of the die 20) so that the iron core laminates 2 blanked by the punch 10 and pushed out of the die 20 are retained in the squeeze ring 22 with a prescribed side pressure, and pushed progressively downward.

The back pressure device 6 includes a support table 31 on which the blanked iron core laminates 2 are stacked, a support unit 32 supporting the support table 31 from below, a lifting motor 33 providing the power for vertically moving the support table 31 via the support unit 32, a controller (control unit) 34 for controlling the operation of the lifting motor 33 and a driver 35 for driving the lifting motor 33 according to the command from the controller 34. The motor 33 may consist of any per se known electric motor such as a servo motor and a stepping motor.

The support table 31 is provided with a planar upper surface 31a which engages the lower surface of the stack of iron core laminates 2 in the die 20 or the squeeze ring 22 so that a back pressure (pushing force) may be applied to the iron core laminates 2 by pushing the iron core laminates 2 stacked upon the upper surface 31a upward. The support table 31 is moveable between an upper limit position defined adjacent to the upper end of the die 20 and a lower limit position (delivery position) defined under the squeeze ring 22. When the support table 31 has descended to the delivery position under the lower die assembly 5, the laminated iron core 3 is pushed out from the support table 31 to a transfer unit by a pusher 36 (See FIG. 5(D) which will be referred to hereinafter), and the laminated iron core 3 that is pushed out is transported to an assembly line via a conveyor or the like included in the transfer unit.

In the illustrated embodiment, the lamination crimp method is used for fixedly attaching the iron core laminates 2 with one another, and each adjoining pair of iron core laminates 2 are joined to each other to form the laminated iron core 3 by crimping the recess and the projection formed on the opposing surfaces of the iron core laminates 2 with each other. However, in the progressive die apparatus 1 of the present invention, not only the lamination crimp method but also other per se known methods such as the lamination bonding method using an adhesive agent and the laser welding method using laser welding may also be used.

The support unit 32 includes a vertically extending support shaft 41 and a ball screw 42 consisting of a nut 43 and a screw shaft 44. The support shaft 41 consists of a shaft having a high stiffness, and is prevented from lateral movement by a guide arrangement not shown in the drawings. The upper end of the support shaft 41 is connected to a lower part of the support table 31, and the lower end of the support shaft 41 is fixedly attached to the nut 43. Although not shown in the drawings, the screw shaft 44 is formed with a shaft side thread groove, and the nut 43 is formed with a nut side thread groove that cooperates with the shaft side thread groove to define a spiral passage for receiving balls (rigid balls) therein, and the nut 43 is further formed with a recirculation passage and a deflect for recirculating the balls in the spiral passage. The screw shaft 44 is directly connected to the output shaft of the lifting motor 33 in a coaxial relationship.

Owing to this arrangement of the support unit 32, the rotation of the lifting motor 33 in the normal direction causes the screw shaft 44 to rotate in the normal direction so that the nut 43 moves upward, and the support shaft 41 (along with the support table 31) fixedly attached to the nut 43 also moves upwards. Conversely, when the screw shaft 44 is rotated in the reverse direction with the reverse rotation of the lifting motor 33, the nut 43 moves downward, and the support shaft 41 attached to the nut 43 hence moves downward.

In the illustrated embodiment, the screw shaft 44 is rotated by the lifting motor 33. Alternatively, the nut 43 may also be rotated by the lifting motor 33. In the latter case, the support table 31 is attached to the sere shaft 44 so that the screw shaft 44 moves upward or downward (or the support table 31 moves upward or downward) depending on the rotational direction of the nut 43.

The lifting motor 33 is provided with an encoder 51 serving as a speed/position detecting device for detecting the rotational speed and the rotational angle (angular position) of the lifting motor 33. The encoder 51 forwards the detection signal in the form of an encoder signal (speed/position detection signal) to a driver 35. The speed/position detecting device for the lifting motor 33 may also consist of any other detecting device such as a resolver, instead of the encoder 51. It is also possible to use a linear scale as the speed/position detecting device for detecting the position of the nut 43, and the detection result of the linear scale may be forwarded to the driver 35 as the speed/position detect on signal.

The controller 34 receives a synchronization signal containing information on the angular position (phase) of the crankshaft 16 (or the timing of the vertical movement of the punch 10) from the encoder 17 provided on the upper die assembly 4, and controls the rotation of the lifting motor 33 (and hence the vertical movement of the support table 31) by sending a speed command and a position command for the lifting motor 33 to the driver 35 according to the received synchronization signal. By receiving at least one of the speed command and the posit on command from the controller 34 and the speed/position detection signal (or the speed and position feedback signal) from the encoder 51, the driver 35 adjusts the electric current supplied from a power source (not shown in the drawings) to the lifting motor 33 so that the rotational speed and the stop position of the lifting motor 33 (or the vertical speed and the stop position of the support table 31) may be controlled.

The controller 34 forwards a torque limit command (torque limit value) to the driver 35 based on one or more predetermined torque limit values. The torque limit value or values may be determined such that at least the iron core laminates 2 may not be pushed upward by taking into account the pressure (side pressure) applied by the squeeze ring 22 to the peripheral surface of the iron core laminates 2 and the thickness of the iron core laminates 2. According to the torque limit command from the controller 34, the driver 35 limits the electric current supplied to the lifting motor 33 so that the output torque (or the back pressure produced by the back pressure device 6) may be limited in a corresponding manner. The torque limit value for the lifting motor 33 is preferably determined such that the force produced by the lifting motor 33 to raise the support table 31 is smaller than the pressure applied by the punch 10.

In this progressive die apparatus 1, the first iron core laminate 2 that has been blanked by the punch 10 is placed on the support table 31, and the subsequently blanked iron core laminates 2 are stacked on the iron core laminates 2 that are previously blanked and stored in the die 20. The iron core laminates 2 are then pushed into the squeeze ring 22 under the die 20 one after the other until a prescribed number of iron core laminates are fixedly attached to one another (into an iron core 3). When the punch 10 blanks each iron core laminate 2, a downward pressure is applied to the support table 31 supporting the iron core laminates 2, and when this downward pressure exceeds the torque limit value, the motor 33 turns in the reverse direction because of the ball screw 42 is configured to be reversible. The reverse movement of the ball screw 42 provides the functions of providing the required back pressure and mitigating the load on the support unit 3 (buffering the punching load) and the associated parts in a similar fashion as a conventional gas spring or the like. The structure is not limited by the illustrated embodiment, but may be configured in other ways as long as a reversible ball screw is employed.

Although not described in any great detail in this disclosure, in the progressive die apparatus 1, the iron core laminates 2 are successively formed by punching pilot holes, slots and inner peripheral teeth in a per se known manner prior to the blanking of the iron core laminates 2 and the stacking (fixing) of the blanked iron core laminates which were discussed in the foregoing part of this disclosure. The strip layout (configuration of each iron core laminate 2) for this progressive die apparatus 1 may be selected as desired as long as the back pressure may be applied to the iron core laminates 2 during the process of blanking the iron core laminates 2 by using the back pressure device 6.

Figure 2:
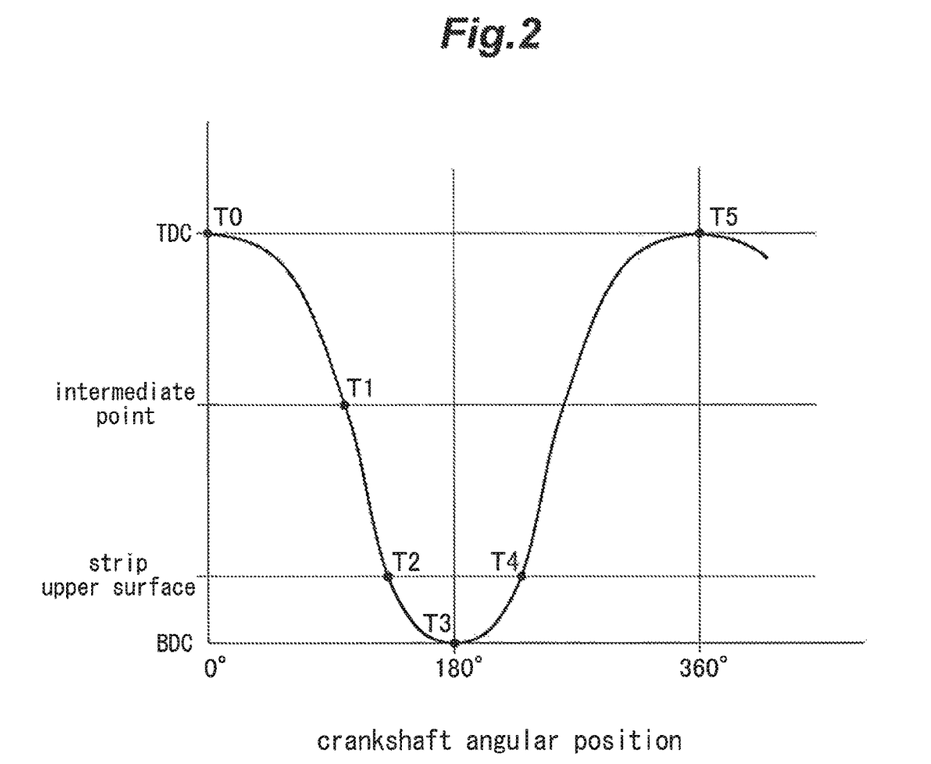
FIG. 2 is a graph showing the relationship between the position of the punch and the rotational angle of the crankshaft in the progressive die apparatus.
Figure 3:
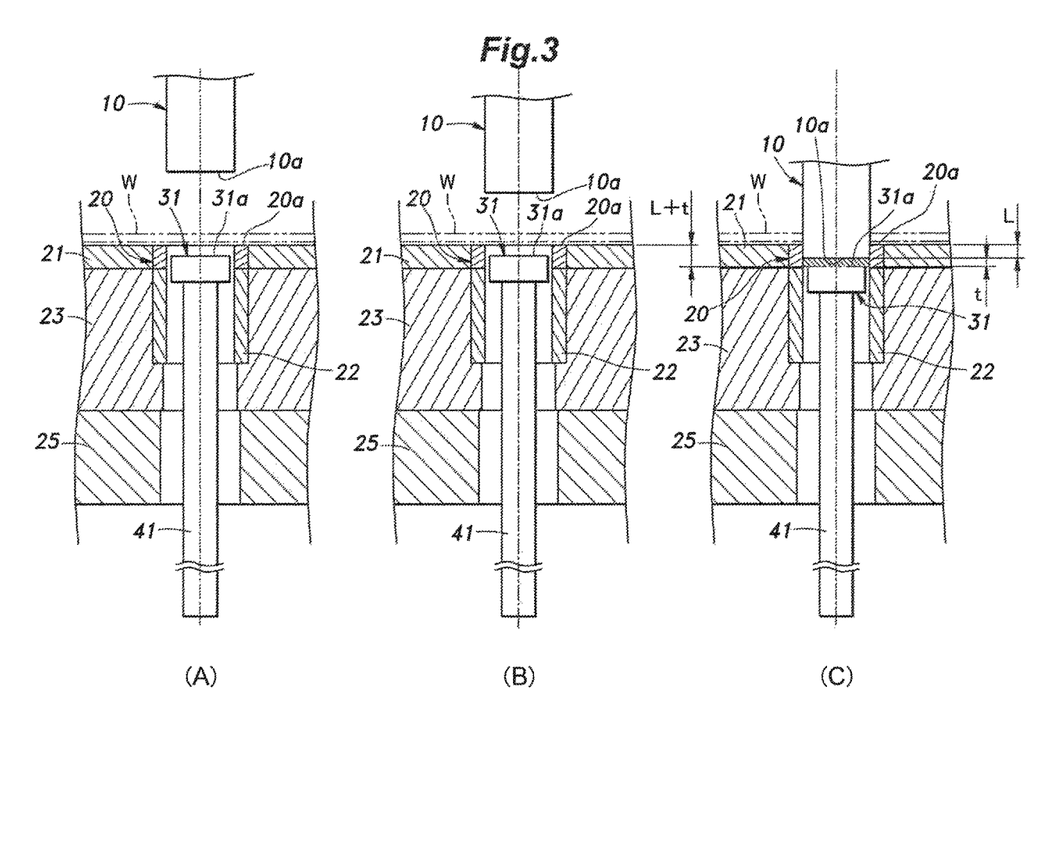
FIG. 3 shows the mode of operation of the back pressure device when punching out the (first) iron core laminate.

FIG. 2 shows the relationship between the position of the punch and the angular position of the crankshaft in the progressive die apparatus 1. FIGS. 3(A) to 3(B) show the various steps taken by the back pressure device when blanking the first (uppermost) iron core laminate.

In the graph of FIG. 2, the ordinate corresponds to the position of the front end 10a of the punch 10 which moves vertically in dependence on the vertical position of the crank pin 16a of the crankshaft 16, and the abscissa corresponds to the angular position of the crankshaft 16. T1 to T6 in FIG. 2 indicate the time points (or elapsed e) at the respective angular positions. As shown in the drawings, the punch 10 moves from the top dead center (TDC) at time T0 (crankshaft angular position 0 degree) to the bottom dead center (BDC) at time T3 (crankshaft angular position 180 degrees), and back to the top dead center at T5. Time T2 corresponds to the time point at which the front end 10a of the punch 10 has descended to the surface of the sheet metal strip W, and time T4 corresponds to the time point at which the front end 10a of the punch 10 has ascended back to the surface of the sheet metal strip W from the bottom dead center.

The blanking operation of the sheet metal strip W by the punch 10 is performed during the time interval of time T2 to time T4 during which the punch 10 comes into contact with the sheet metal strip W and returns to the original position. However, in reality the blanking of each iron core laminate 2 in the die 20 is substantially completed during the time interval of from time T2 to time T3 during which the punch comes into contact with the sheet metal strip Wand passes the bottom dead center.

In the illustrated embodiment, the synchronization signal of the encoder 17 includes two types of synchronization signals. Synchronization signal I is sequentially forwarded from the encoder 17 at a timing immediately following the start of each blanking operation for the iron core laminates 2 (T0 or T5 in FIG. 2), and synchronization signal 2 is sequentially forwarded from the encoder 17 at a timing preceding the time point where the punch 10 reaches the bottom dead center (T3 in FIG. 2) by a prescribed time period Tz.

FIG. 3(A) shows the state in which the punch 10 is about to undergo the vertical movement, and the front end 10a of the punch 10 is at the upper limit position (corresponding to the top dead center at time T0 in FIG. 2). The support table 31 is at the initial position (the upper limit position of the support table 31 in this case) which is lower than the upper end surface 20a of the die 20 by a prescribed distance. After temporarily stopping at this initial position, the support table 31 descends to the blanking position for the blanking operation of the first iron core laminate 2.

FIG. 3(B) s lows the state in which the punch as started descending from the upper limit position shown in FIG. 3(A) toward the sheet metal strip W so that the front end 10a of the punch 10 is intermediate (or the intermediate position at time T1 in FIG. 2) between the upper limit position and the lower limit position (corresponding to the bottom dead center at time T3 in FIG. 2). The upper surface 31a of the support table 31 is at the same position as in FIG. 3(A).

FIG. 3(C) shows the state in which the punch 10 is in the process of blanking the first iron core laminate 2, and the front end 10a of the punch 10 is at the lower limit position (corresponding to the bottom dead center at time T3 in FIG. 2). Owing to the reverse movement of the ball screw 42 caused by the pressure from the punch 10, the support table 31 moves downward from the position shown in FIG. 3(B). At this time, the upper surface 31a of the support table 31 descends to the position (blanking position) which is lower than the upper end surface 20a of the die 20 by a distance corresponding to the sum (L+t) of the intrusion distance L (See FIG. 3(C)) of the punch 10 into the die 20 at the lower limit position of the die 20 and the thickness t of the iron core laminate 2.

Figure 4:
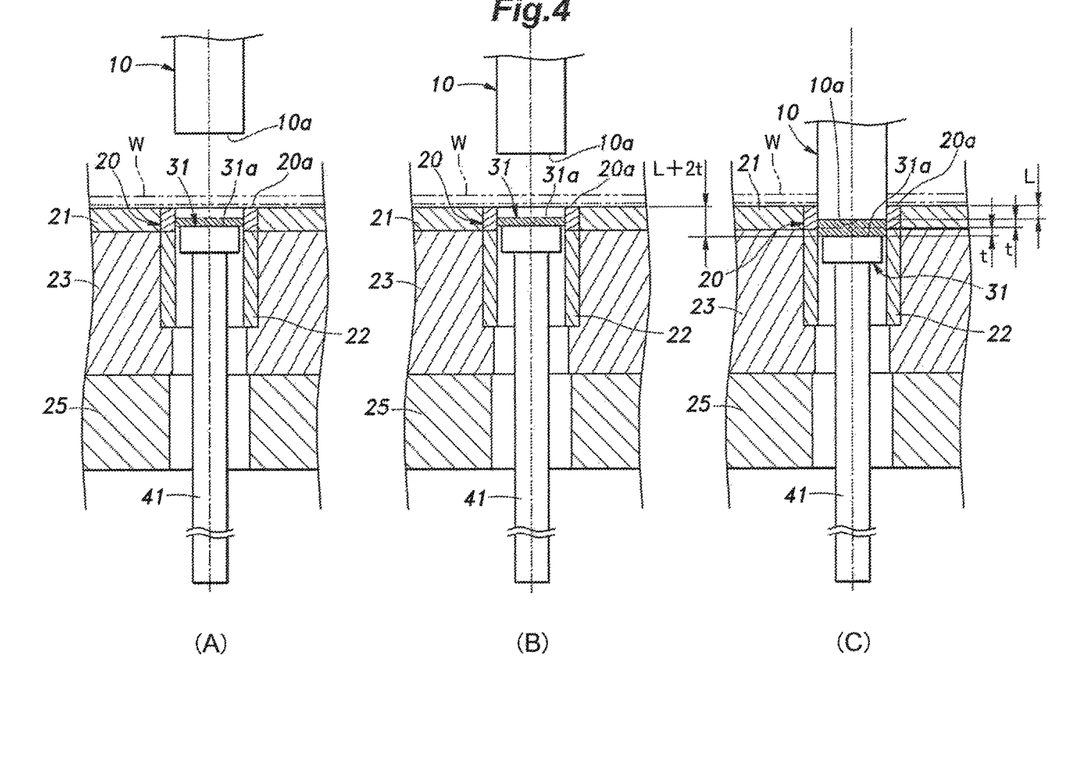
FIG. 4 shows the mode of operation of the back pressure device when punching out the (second) iron core laminate.

FIG. 4 is a diagram showing the mode of operation of the back pressure device when the second iron core laminate is blanked in the progressive die apparatus.

FIG. 4(A) shows the state in which the punch 10 has returned to the upper limit position (corresponding to the top dead center at time T5 in FIG. 2) once again following the blanking of the first iron core laminate 2. Meanwhile, the upper surface 31a of the support table 31 is lower than the upper end surface 20a of the die 20 by L+t similarly as in FIG. 3(C).

FIG. 4(B) shows the state in which the punch 10 has started descending from the upper limit position shown in FIG. 4(A) toward the sheet metal strip W once again, and the front end 10a of the punch 10 is intermediate between the upper limit position and the lower limit position similarly as in FIG. 3(B). The upper surface 31a of the support table 31 is in the same position as in FIG. 4(A).

FIG. 4(C) shows the state in which the punch 10 is in the process of blanking the second iron core laminate 2, and the front end 10a of the punch 10 is at the lower limit position as in the case of FIG. 3(C). The upper surface 31a of the support table 31 descends from the position shown in FIG. 4(B) under the pressure of the punch 10 owing to the reverse operation of the ball screw 42. At this time, the upper surface 31a of the support table 31 descends to the lower blanking position which is lower than the upper end surface 20a of the die 20 by a distance corresponding to the sum (L+2t) of the intrusion distance L (See FIG. 4(C)) of the punch 10 into the die 20 and the thickness 2t of the two layers of the iron core laminates 2. A similar process is repeated for the third and the subsequent iron core laminates 2.

Figure 5:
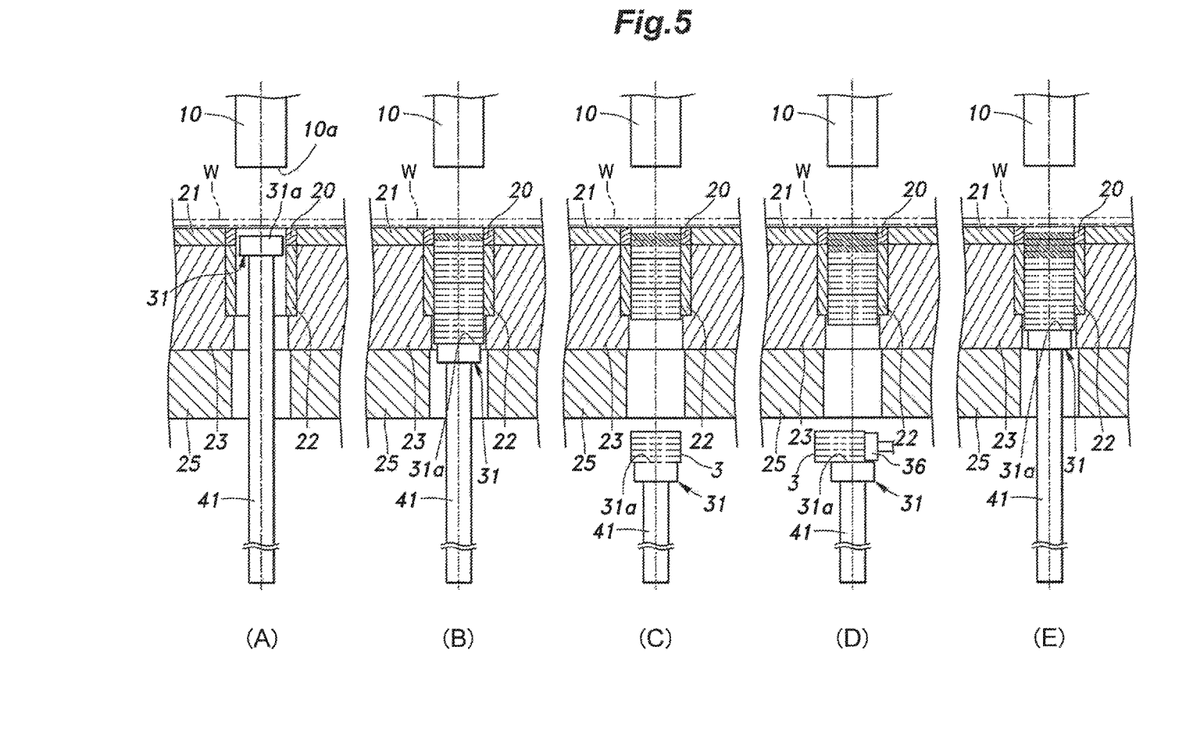
FIG. 5 shows different stages of operation of the back pressure device delivering a laminated iron core.

FIGS. 5(A) to 5(E) are diagrams illustrating the mode of operation of the back pressure device when the laminated iron core is being delivered. FIG. 5(A) shows a similar state as the state shown in FIG. 3(A). Thereafter, by repeating the operations (blanking step arid stacking step) shown in FIGS. 3 and 4, iron core laminates 2 are blanked and stacked in the die 20 one after another in the progressive die apparatus 1. In particular, each blanked iron core laminate 2 is pushed out of the die 20 and into the squeeze ring 22 while receiving the side pressure from the squeeze ring. 22 and the back pressure from the back pressure device 6 so that the iron core laminates 2 are firmly pushed against one another and fixedly attached to one another (by crimping in this case) as shown in FIG. 5(B).

FIG. 5(C) shows the state in which a group consisting of a prescribed number of fixedly attached iron core laminates 2 is ejected from the lower end of the squeeze ring 22 as an individual laminated iron core 3. At this time, the support table 31 supporting the laminated iron core 3 has descended to the lower transportation position (lower limit position in this case) under the lower die assembly 5.

FIG. 5(D) shows the state in which the laminated iron core 3 on the support table 31 in the transportation position is being pushed out onto a transportation line (not shown in the drawings) by a pusher 36. Once the iron core 3 is pushed out onto the transportation line (or pushed off from the upper surface 31a), the support table 31 ascends to the initial position once again. At this time, the upper surface 31a of the support table 31 comes into contact with the lower surface of the lowermost iron core laminate 2 of the laminated iron core 3 positioned in the lowermost part of the squeeze ring 22 as shown in FIG. 5(E). As a result, the iron core laminates 2 in the squeeze ring 22 are subjected to the back pressure once again.

Figure 6:
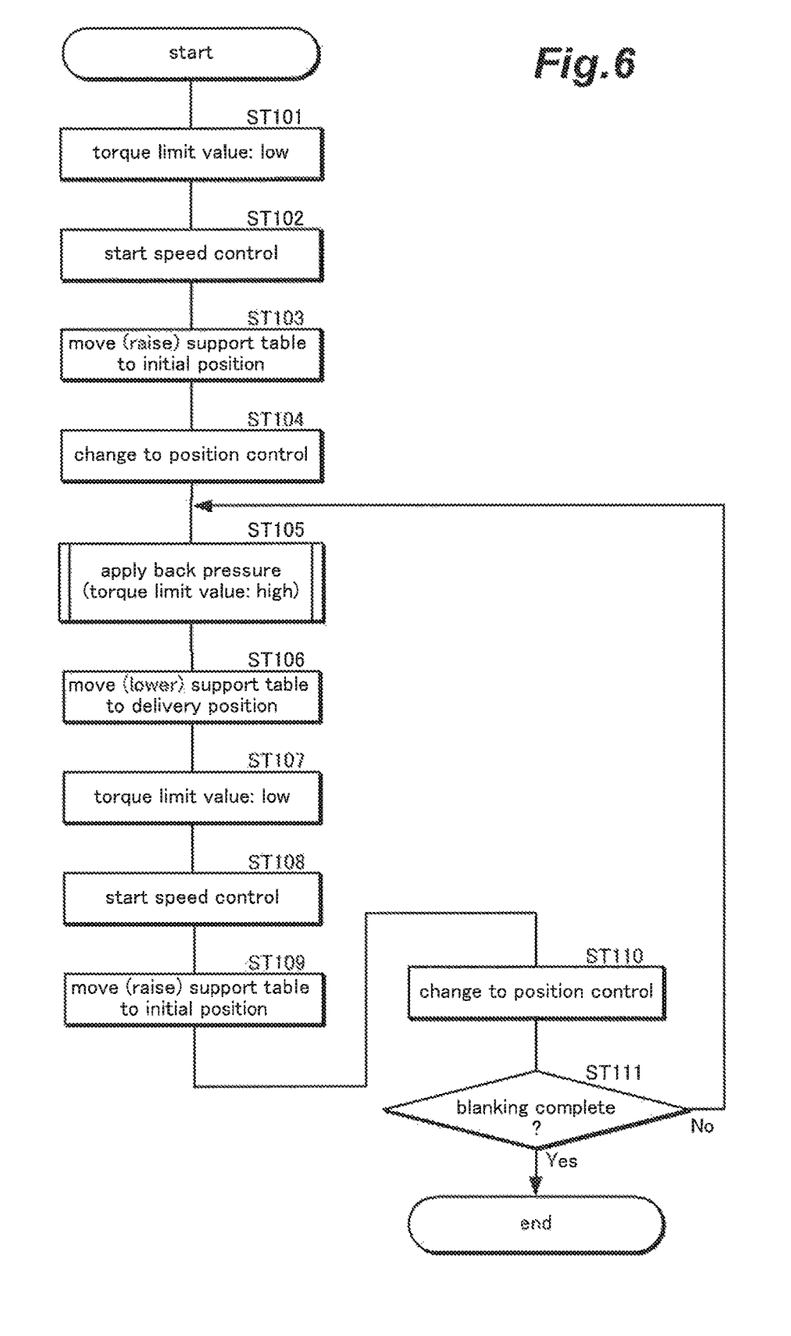
FIG. 6 is a flowchart showing the mode of operation of the back pressure device.

FIG. 6 is a flowchart showing the operation sequence of the back pressure device. When the back pressure device 6 is activated, the controller 34 carries out steps ST101 to ST104 which are described hereinafter as an initial operation prior to the blanking operation in the progressive die apparatus 1.

In the initial operation, the controller 34 forwards a torque limit command for setting the torque limit value to a "low value" to the driver 35 which in turn sets a current limit value to be applied to the lifting motor 33 based on the torque limit value (step ST101).

In the illustrated embodiment, the torque limit value is set in two different levels, "high value" and "low value", and the torque is always limited either to the high value or to the low value. The low value is selected so as not to cause the pushing up of the iron core laminates 2, or more preferably so as not to cause the pushing up of the iron core laminates 2 and to prevent the warping of the iron core laminates 2 which could be otherwise caused by the side pressure from the squeeze ring 22. The low value may be selected at least so as to allow the support table 31 to be moved up and down. The high value is at least greater than the low value. The high value could cause the pushing up of the iron core laminates 2 when the iron core laminates 2 are not subjected to a downward pressure owing to the blanking operation of the punch 10 (or during a non-blanking interval). However, the high value may also be selected so as not to cause the pushing up of the iron core laminates 2 even during the non-blanking interval without departing from the spirit of the present invention.

Thereafter, the controller 34 begins the speed control by forwarding a speed command for the lifting motor 33 to the driver 35 (step ST102) so that the support table 31 ascends to the initial position at a prescribed speed (step ST103). At this time, if there is no iron core laminate 2 in the die 20 and the squeeze ring 22, the initial position of the support table 31 is determined as the prescribed upper limit position (See FIG. 3(A)). On the other hand, if there are blanked iron core laminates 2 in the die 20 or the squeeze ring 22, the controller 34 detects the contact (collision) of the support table 31 with the lower surface of the iron core laminates 2, and the detected position (See FIG. 5(E)) is set as the initial position of the support table 31. The contact of the support table 31 with the lower surface of the iron core laminates 2 can be detected from the load current of the lifting motor 33. Alternatively, a force sensor 55 (See FIG. 1) may be provided on the support table 31 to detect the contact of the support table 31 by using this force sensor 55. If desired, any other per se known sensor such as a proximity sensor may also be used for detecting the contact of the support table 31 with the lower surface of the iron core laminates 2 instead of the force sensor 55. The control process for step ST102 consists of a speed control process and the control process for step ST104 consists of a position control process as a preferred example, but each of these control process may also consist of any of a speed control process, a position control process and a torque control process.

Thereafter, the controller 34 changes the mode of control from the speed control process to a position control process (step ST104), and performs the step of applying the back pressure during the blanking process (step ST105). The details of step ST105 will be discussed hereinafter, but the torque limit value is set to the high value in step ST105. Once the back pressure application in step ST105 is finished (or the laminated iron core 3 is ejected from the squeeze ring 22, and is required to be transported), the controller 34 performs steps ST106 to ST110 as the process of delivering the laminated iron core 3 from the progressive die apparatus 1.

Upon starting the process of delivering the laminated iron core 3, the controller 34 lowers the support table 31 to the transportation position by forwarding a positioning command to the driver 35 (step ST106). Thereafter, the controller 34 forward a torque limit command to the driver 35 to set the torque limit value to the low value (step ST107), and resumes the speed control by forwarding a speed command to the driver 35 (step ST108). As a result, the support table 31 ascends to the initial position at the prescribed speed (step ST109). At this time, the controller 34 detects the contact (collision) of the support table 31 with the lower surface of the blanked iron core laminates 2, and sets the initial position as the position at which the contact has taken place.

Thereafter, the controller 34 changes the control mode from the speed control to the position control (step ST110). If the blanking of all of the iron core laminates 2 has not been completed (ST111: No), the process flow returns to step ST105, and the subsequent steps are repeated as discussed above. When the blanking of all of the iron core laminates 2 has been completed (ST111: Yes), the operation of the back pressure device 6 is also completed. The control mode for step ST108 consisted of a speed control process and the control mode for step ST110 consisted of a position control process as a preferred example, but each of these control process may also consist of any of a speed control process, a position control process and a torque control process.

Figure 7:
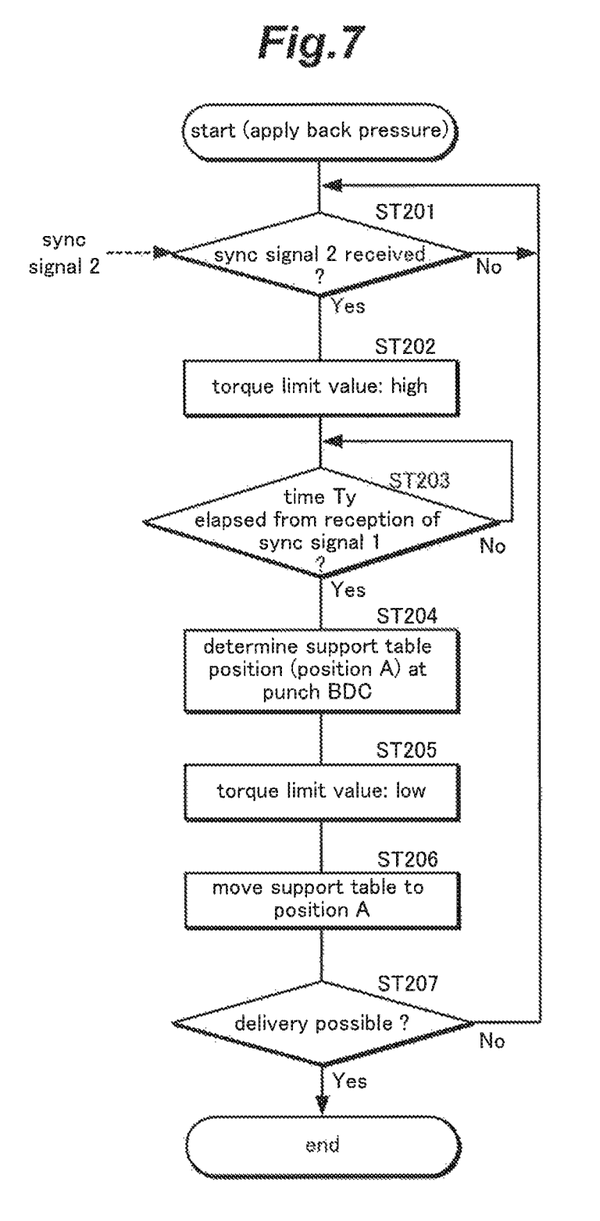
FIG. 7 is a flowchart showing the details of the process of step 105 in FIG. 6.

FIG. 7 is a flowchart showing the details of the process executed in step ST105 shown in FIG. 6. When the blanking of iron core laminates 2 is started in the progressive die apparatus 1, the controller 34 waits for the synchronization signal 2 to be forwarded from the encoder 17 of the upper die assembly 4 (step ST201).

Thereafter, upon receiving the synchronization signal 2 (step ST201: Yes), the controller 34 forwards a torque limit command for setting the torque limit value to the high value to the driver 35 which in turn determines the limit value of the current supplied to the lifting motor 33 according to the received torque limit command (step ST202). When the elapsing of a prescribed time period Ty (time required for the punch 10 to reach the bottom dead center) from the time point of receiving the synchronization signal 1 (step ST203: Yes) is determined, the position of the support table 31 at that particular time point is determined (and stored) as the position (position A) of the support table 31 when the punch 10 has reached the bottom dead center (step ST204), The controller then forwards a torque limit command for setting the torque limit value to the low value to the driver 35 (step ST205), and forwards a positioning command for the lifting motor 33 to the driver 35. Therefore, if the support table 31 deviates from position A, the support table 31 is moved to position A (step ST206). The actions in steps ST201 to ST206 are repeated until the time point-here each laminated iron core 3 is ejected from the squeeze ring 22 (step ST207: Yes) is reached. The controller 34 determines the timing of ejecting each laminated iron core 3 in step ST207 by detecting if the support table 31 has reached a predetermined position which is suitable for transportation of the laminated iron core 3.

Figure 8:
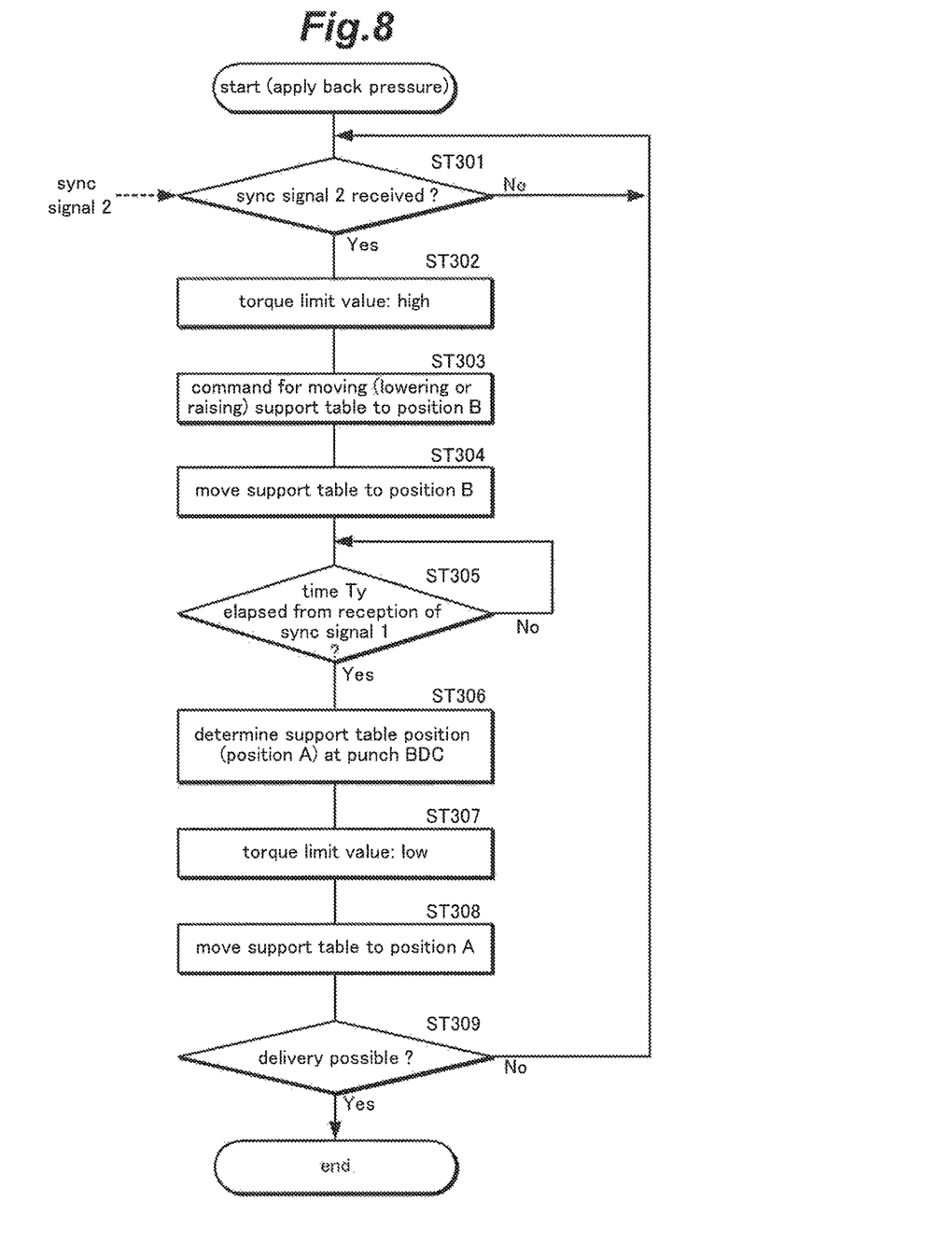
FIG. 8 is an alternate flowchart showing a modified embodiment of the process of step 105 in FIG. 6.

FIG. 8 is a flowchart showing a modified embodiment of the process in step ST105 shown in FIG. 6. Once the blanking operation for the iron core laminates 2 is started in the progressive die apparatus 1, the controller 34 waits for the reception of the synchronization signal 2 forwarded by the encoder 17 on the side of the upper die assembly 4 (step ST301).

Thereafter, upon receiving the synchronization signal 2 (step ST301: Yes), the controller 34 forwards a torque limit command for setting the torque limit value to the high value to the driver 35 (step ST302). Then, the controller 34 forwards a positioning command for moving the support table 31 to a predetermined position B (target position) to the driver 35 (step ST303).

Thereafter, according to the positioning command issued in step ST302, the support table 31 moves to the predetermined position B (step ST304). The time period Tz may be selected such that the support table 31 is in the process of moving toward the position B when the punch 10 has reached the bottom dead center. In other words, the punch 10 reached the bottom dead center while the support table 31 was stationary in the embodiment shown in FIG. 7, but the punch 10 reaches the bottom dead center while the support table 31 is either ascending or descending in the case of the modified embodiment shown in FIG. 8. Thereby, the back pressure device 6 is enabled to produce a more appropriate, back pressure while the iron core laminates 2 are being blanked. Whether the support table 31 is ascending or descending at that time may be selected in dependence on the side pressure of the squeeze ring 22 and/or the thickness of the iron core laminates 2. The movement of the support table 31 in step ST303 is preferably based on the position control, but may also be based on multiple kinds of control principles. For instance, the control action may be based on the combination of the command for raising or lowering the support table 31 (normal or reverse rotation of the motor 33) and the speed control or the torque control.

The subsequent steps ST305 to ST309 may be similar to steps ST203 to ST207 shown in FIG. 7.

Thus, in the back pressure device 6 of the progressive die apparatus 1, the controller 34 sets two kinds of torque limit values (high value and low value) so that the torque limit value during the blanking interval for the iron core laminates 2 or the high value is greater than the torque limit value during non-blanking interval for the iron core laminates 2 or the low value. Therefore, the pushing up of the iron core laminates 2 is prevented by using the relative low torque limit value or the low value during the non-blanking interval for the iron core laminates 2, and the contact (the bonding force) between the iron core laminates 2 can be enhanced and the volume ratio of the iron core laminates 2 can be improved by using the relatively high torque limit value or the high value during the blanking interval for the iron core laminates 2.

The mode of selecting the torque limit values is not limit to that discussed above, and can be modified so as to use a larger number of torque limit values for different operation phases of the progressive die apparatus I as long as the maximum torque limit value is applied during the blanking interval for the iron core laminates 2 (at least a time interval including time T3 shown in FIG. 2). However, when only two torque limit values "high value" and "low value" are used, the control of the lifting motor 33 can be simplified.

Although the present invention has been described in terms of preferred embodiments thereof, it is obvious to a person skilled in the art that various alterations and modifications are possible without departing from the scope of the present invention. The components included in the back pressure device for the progressive die apparatus and the progressive die apparatus equipped with the back pressure device are not entirely essential for the implementation of the present invention, but may be partly substituted and omitted without departing from the spirit of the present invention.

GLOSSARY OF TERMS 1 progressive die apparatus
2 iron core laminate
3 laminated iron core
4 upper die assembly
5 lower die assembly
6 back pressure device
10 punch
16 crankshaft
20 die
20a upper surface
22 squeeze ring (iron core retaining member)
31 support table
31a upper surface
32 support unit
33 lift motor
34 controller (control unit)
35 driver
41 support shaft
42 ball screw
43 nut
44 screw shaft
51 encoder
55 force sensor
W sheet metal strip (sheet steel strip)

The invention claimed is:

1. A progressive die apparatus, comprising:
an upper die assembly,
a lower die assembly configured to cooperate with the upper die assembly to blank iron core laminates from intermittently transported sheet steel strip, the lower die assembly including an iron core retaining member that retains the blanked iron core laminates therein; and
a back pressure device, the back pressure device comprising:
a support table disposed in a vertically moveable manner in the iron core retaining member such that the core laminates are stacked thereon one after another;
a support table support unit;
a lifting motor configured to move the support table in a vertical direction via the support table support unit; and
a lifting motor rotational control unit;
wherein the lifting motor rotational motion control unit is configured to set a plurality of torque limit values for limiting an output torque of the lifting motor such that during a blanking interval, the output torque is limited by a maximum of the plurality of torque limit values.

2. The progressive die apparatus according to claim 1, wherein the lifting motor rotational motion control unit is configured to limit the output torque of the lifting motor at all times, and the torque limit values consist of a high torque limit value for a blanking interval and a low torque limit value for a non-blanking interval.

3. The progressive die apparatus according to claim 1, wherein the lifting motor rotational motion control unit is configured to perform a position control of the lifting motor at least during a blanking interval.

4. The progressive die apparatus according to claim 1, wherein the support table unit comprises a ball screw configured to facilitate the vertical movement of the support table with a rotative actuation by the lifting motor, and wherein the ball screw is configured to undergo a reverse movement by a downward pressure applied to the support table during a blanking interval.

5. The progressive die apparatus according to claim 1, wherein the lifting motor rotational motion control unit is configured to control the lifting motor such that the support table is raised or lowered during a blanking interval.

6. The progressive die apparatus according to claim 5, wherein the lifting motor rotational motion control unit is configured to perform a position control of the lifting motor such that the support table is moved to a target position during the blanking interval.

7. A back pressure device for a progressive die apparatus for blanking iron core laminates from intermittently transported sheet steel strip and stacking a plurality of iron core laminates into individual iron cores, comprising:
a support table disposed in a vertically moveable manner for stacking the iron core laminates thereon one after another;
a support table support unit;
a lifting motor configured to move the support table in a vertical movement relative to the support table via the support table support unit; and
a lifting motor rotational motion control unit;
wherein the lifting motor rotational motion control unit is configured to set one or more predetermined torque limit values for limiting an output torque of the lifting motor to prevent the iron core laminates from being pushed up by the support table.

8. The back pressure device for progressive die apparatus according to claim 7, wherein the lifting motor rotational motion control unit is configured to set a plurality of torque limit values so that the torque limit value during a blanking interval is greater than the torque limit value during a non-blanking interval.

* * * * *